US008079641B2

(12) United States Patent
Lung et al.

(10) Patent No.: US 8,079,641 B2
(45) Date of Patent: Dec. 20, 2011

(54) ADJUSTING APPARATUS AND VEHICLE SEAT

(75) Inventors: Ching-Yung Lung, Hsinchu County (TW); Hsiu-Chu Shen, Taipei County (TW)

(73) Assignee: Red Heart Enterprise Co., Ltd., Sinjhuang, Taipei County (TW)

( * ) Notice: Subject to any disclaimer, the term of this patent is extended or adjusted under 35 U.S.C. 154(b) by 322 days.

(21) Appl. No.: 12/470,524

(22) Filed: May 22, 2009

(65) Prior Publication Data

US 2010/0052392 A1 Mar. 4, 2010

(30) Foreign Application Priority Data

Aug. 27, 2008 (TW) ............................ 97132697 A

(51) Int. Cl.
*A47C 1/00* (2006.01)
(52) U.S. Cl. .............................. 297/344.24; 297/344.26
(58) Field of Classification Search ............. 297/344.24, 297/344.21, 344.26; 296/65.12
See application file for complete search history.

(56) References Cited

U.S. PATENT DOCUMENTS

| 3,066,979 | A | * | 12/1962 | Pitts et al. ............. 297/344.24 X |
| 3,973,799 | A | * | 8/1976 | Berg ..................... 297/344.24 X |
| 5,474,353 | A | * | 12/1995 | Koester et al. .......... 297/344.21 |
| 6,981,746 | B2 | * | 1/2006 | Chung et al. ............ 297/344.21 |

FOREIGN PATENT DOCUMENTS

TW  388022  4/2000

OTHER PUBLICATIONS

English Abstract of JP2003127726, Publication date May 8, 2003.
English Abstract of TW388022, Publication date Apr. 21, 2000.
English Abstract of FR2776583, Publication date Oct. 1, 1999.
English Abstract of JP2002065748, Publication date Mar. 5, 2002.
English Abstract of JP2002337577, Publication date Nov. 27, 2002.

* cited by examiner

*Primary Examiner* — Anthony D Barfield
(74) *Attorney, Agent, or Firm* — Thomas, Kayden, Horstemeyer & Risley, LLP

(57) ABSTRACT

The invention discloses an adjusting apparatus for adjusting vehicle seat. The adjusting apparatus of the invention includes a first guiding rail, a base and a supporting member. The first guiding rail is mounted on a floor of a vehicle. The base further includes a first sliding portion, slidably disposed in the first guiding rail; a receiving base disposed on the first sliding portion; and a rotation-guiding groove. The supporting member further includes an axle rotatably mounted in the receiving base; and a guiding wheel movably disposed in the rotation-guiding groove. When the first sliding portion slides in the first guiding rail, the base and the supporting member slide opposite to the first guiding rail. Additionally, when the axle rotates in the receiving base, the guiding wheel moves along the rotation-guiding groove, so that the supporting member rotates opposite to the base.

18 Claims, 4 Drawing Sheets

ADJUSTING APPARATUS AND VEHICLE SEAT

CROSS-REFERENCE TO RELATED APPLICATION

This application claims priority to Taiwan Application Serial Number 097132697, filed Aug. 27, 2008, which is incorporated herein by reference.

BACKGROUND OF THE INVENTION

1. Field of the Invention

The present invention relates to an adjusting apparatus for adjusting a vehicle seat and the vehicle seat comprising the same; and more particularly, to an adjusting apparatus which can rotate and slide the vehicle seat simultaneously and the vehicle seat comprising the same.

2. Description of the Prior Art

With the progress of technology and the increasing importance of the right of the disabled, some manufacturers continuously develop vehicle products for the disabled to move conveniently. However, most of the products are developed by foreign manufacturers and belong to some specific models of particular brands of vehicle products. Therefore, the prices of the products are usually rather high and the users need to pay much more for these products.

Because the space within an ordinary vehicle is smaller and the doors of the vehicle are narrower, there is a requirement of a special vehicle seat adjusting apparatus through which the vehicle seats can be rotated and moved to push out the doors in order to be integrated with a matching wheelchair, such that a disabled person is able to move in and out of the vehicle conveniently.

In prior arts, several kinds of vehicle seat adjusting apparatus have been disclosed, such as those of R.O.C Patent Number 388,022 and France Patent Number 2776583. Both of these two patents require larger vehicle space so that they can not adapt to small vehicles. In addition, although Japan Patent Publication Number 2002-337577 requires smaller vehicle space, it takes a stronger structure in design, so both the cost and the complexity of installation will be increased. Moreover, Japan Patent Publication Number 2002-065748 and 2003-127726 use linkages to allow vehicle seats to rotate and move at the same time. But the length of the linkages are fixed, the linkages can not adapt to vehicles of different kinds flexibly. Furthermore, most of vehicle seat adjusting apparatuses need additional devices or elements installed to achieve the simple function of adjusting the vehicle seat forward or backward. In addition, when the vehicle seat of the prior art is rotated, it is easy to be interrupted by the steering wheel (i.e. the seat back of the seat may be blocked by the steering wheel). Therefore, the adjusting apparatus of the vehicle seat is improper to be disposed at the driver's position, but only can be disposed at the copilot's position.

SUMMARY OF THE INVENTION

Accordingly, an aspect of the present invention is to provide an adjusting apparatus for adjusting a seat of a vehicle, so as to solve the mentioned problem.

According to an embodiment of the invention, the adjusting apparatus comprises a first guiding rail, a base and a supporting member. The first guiding rail is mounted on a floor of the vehicle. The base further comprises a first sliding portion, a receiving base and a rotation-guiding groove. The first sliding portion is slidably disposed in the first guiding rail. The receiving base is disposed on the first sliding portion. The supporting member further comprises an axle and a guiding wheel. The axle is disposed on a first side of the supporting member and is rotatably mounted in the receiving base. The guiding wheel is disposed on a second side of the supporting member and is movably disposed in the rotation-guiding groove.

When the first sliding portion slides in the first guiding rail, the base and the supporting member slide opposite to the first guiding rail. In addition, when the axle rotates in the receiving base, the guiding wheel moves along the rotation-guiding groove, so that the supporting member rotates opposite to the base.

Another aspect of the present invention is to provide a vehicle seat comprising the mentioned adjusting apparatus, so as to solve the mentioned problem.

According to an embodiment of the invention, the vehicle seat comprises a cushion, a seat back, a first guiding rail, a base and a supporting member. As mentioned before, the first guiding rail is mounted on the floor of the vehicle. Besides aforementioned first sliding portion, the receiving base and the rotation-guiding groove, the base also comprises a first mounting portion. The first mounting portion, disposed on one side of the base, is used for combining and mounting the seat back. In addition, the supporting member is mounted on the bottom of the cushion and comprises said axle and guiding wheel.

Furthermore, when the first sliding portion slides in the first guiding rail, the base and the supporting member drive the cushion and the seat back to slide opposite to the first guiding rail. Additionally, when the axle rotates in the receiving base, the guiding wheel moves along the rotation-guiding groove, so that the supporting member drives the cushion to rotate opposite to the base.

Therefore, the adjusting apparatus of the invention is using the axle and the guiding wheel of the supporting member, collocated with the receiving base and the rotation-guiding groove of the base, to rotate the cushion of the vehicle seat. Thus, even under the restriction of smaller vehicle space, the adjusting apparatus also can smoothly move the cushion of the vehicle seat out of the vehicle door, so as to combine with a matched wheelchair for facilitating a handicapped person to access the vehicle without other people's help. Particularly, only the cushion is moved out of the vehicle door (the seat back is still in the vehicle) when the vehicle seat of the invention rotates, so that the vehicle seat of the invention can be disposed at the position of the driver without the interruption of the steering wheel.

In addition, the invention can easily achieve the function of moving forward and backward for a general vehicle seat without additional apparatuses or elements. Besides, because of simple structure, low cost and easy assembly, the invention can provide a cheaper price, convenient assembly and use experience of the adjusting apparatus of the vehicle seat for a user. Moreover, the size of the adjusting apparatus of the invention can be reduced or enlarged depending on situations, so as to be suitable for different types of vehicles and to achieve wonderful elasticity in its design.

The objective of the present invention will no doubt become obvious to those of ordinary skill in the art after reading the following detailed description of the preferred embodiment, which is illustrated in following figures and drawings.

BRIEF DESCRIPTION OF THE APPENDED DRAWINGS

DETAILED DESCRIPTION OF THE INVENTION

The invention provides an adjusting apparatus for adjusting a vehicle seat and the vehicle seat comprising the same. Embodiments of the invention will be described in detail in the following, so as to illustrate the characteristic, spirit, advantage and simplification in practice of the invention.

Figure 1:
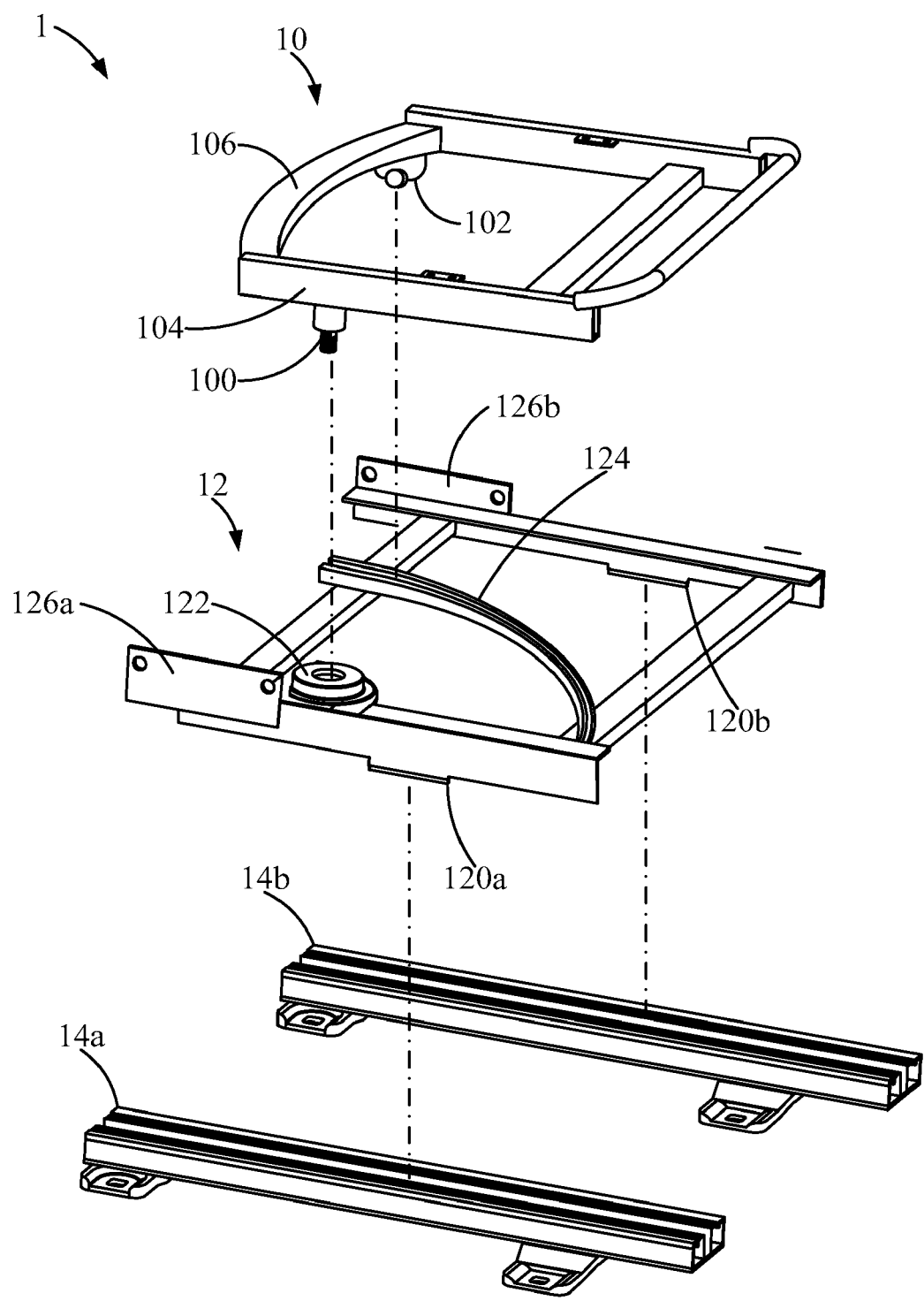
FIG. 1 is a component detonation view illustrating the adjusting apparatus according to an embodiment of the invention.

Please refer to FIG. 1. FIG. 1 is a component detonation view illustrating an adjusting apparatus 1 according to an embodiment of the invention. As shown in FIG. 1, the adjusting apparatus 1 according to the invention comprises a supporting member 10, a base 12, a first guiding rail 14a and a second guiding rail 14b.

The guiding rails 14a and 14b can be mounted on a floor of the vehicle, and the guiding rail 14a is parallel to the guiding rail 14b. In practice, the number of the guiding rails depends on situations, for example, only one guiding rail is used when a lighter or smaller vehicle seat is borne; or, above three guiding rails are used for strengthening the stability of the adjusting apparatus.

The base 12 comprises a first sliding portion 120a, a second sliding portion 120b, a receiving base 122, a rotation-guiding groove 124, a first mounting portion 126a and a second mounting portion 126b. The first sliding portion 120a and the second sliding portion 120b are slidably and respectively disposed in the first guiding rail 14a and the second guiding rail 14b, so that the base 12 can slide along the guiding rails 14a and 14b. Besides, the receiving base 122 is disposed on the first sliding portion 120a. Of course, in practice, the receiving base 122 also can be disposed on other suitable positions.

As shown in the figure, the rotation-guiding groove 124 in the embodiment is located on the circumference of a virtual circle (not shown in the figure), and the center of the virtual circle is the receiving base 122. In practice, the appearance of the rotation-guiding groove 124 and the relation between the rotation-guiding groove 124 and the receiving base 122 can be adjusted depending on situations. The first mounting portion 126a and the second mounting portion 126b are opposite disposed on the base 12 for combining and mounting a seat back (not shown in the figure) of the seat.

The supporting member 10 comprises an axle 100 and a guiding wheel 102. The axle 100 is disposed on a first side 104 of the supporting member 10 and rotatably mounted in the receiving base 122 of the base 12. It should be noted that, in practice, because the receiving base 122 can be disposed on other suitable positions, the axle 100 also can be disposed on other suitable positions to match the receiving base 122, except for the first side 104 of the supporting member 10. Besides, the guiding wheel 102 is disposed on a second side 106 of the supporting member 10. Moreover, the guiding wheel 102 is movably disposed in the rotation-guiding groove 124 of the base 12. As shown in the figure, the first side 104 is roughly perpendicular to the second side 106. In practice, the supporting member 10 is mounted on a bottom of a cushion (not shown in the figure) of the seat.

Figure 2A:
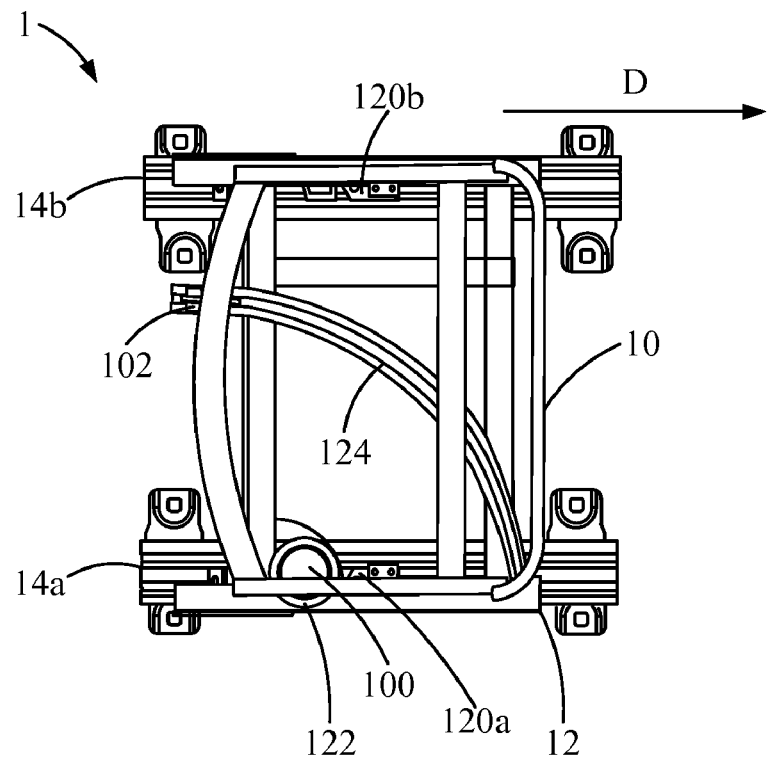
FIG. 2A and FIG. 2B are top views illustrating the adjusting apparatus according to the invention.
Figure 2B:
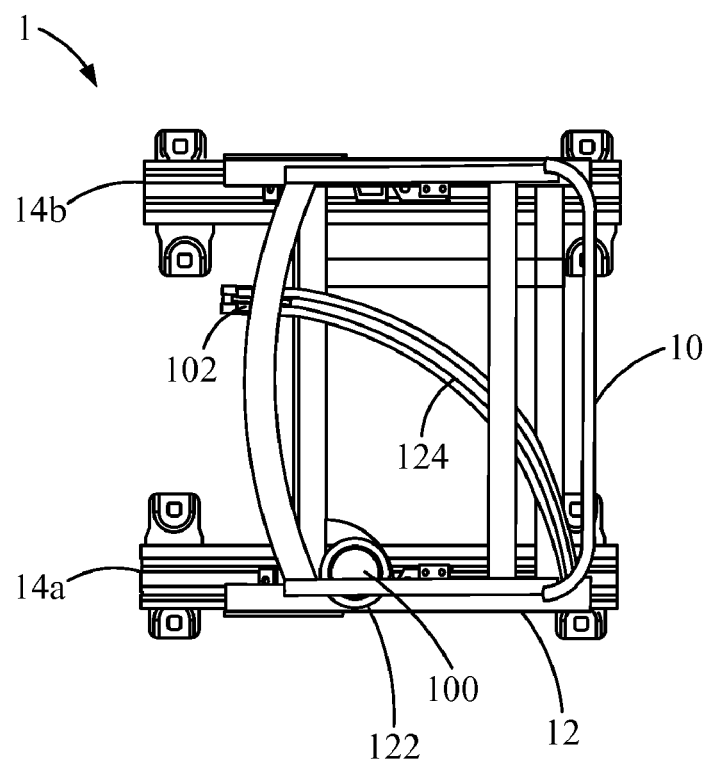

Please refer to FIG. 2A and FIG. 2B. FIG. 2A and FIG. 2B are top views illustrating the adjusting apparatus according to the invention. As shown in the figures, when the first sliding portion 120a and the second sliding portion 120b respectively slide in the first guiding rail 14a and the second guiding rail 14b along a direction D, the base 12 and the supporting member 10 can slide opposite to the first guiding rail 14a and the second guiding rail 14b along the direction D. In practice, each end of the guiding rails 14a and 14b can dispose a fixing block to prevent the first sliding portion 120a and the second sliding portion 120b being disengaged from the guiding rails 14a and 14b.

Figure 3A:
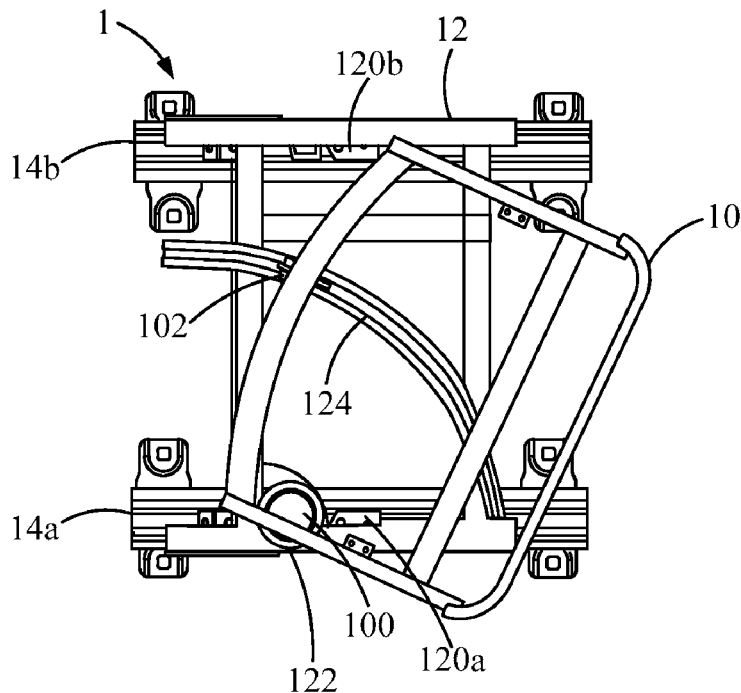
FIG. 3A and FIG. 3B are top views illustrating the adjusting apparatus according to the invention.
Figure 3B:
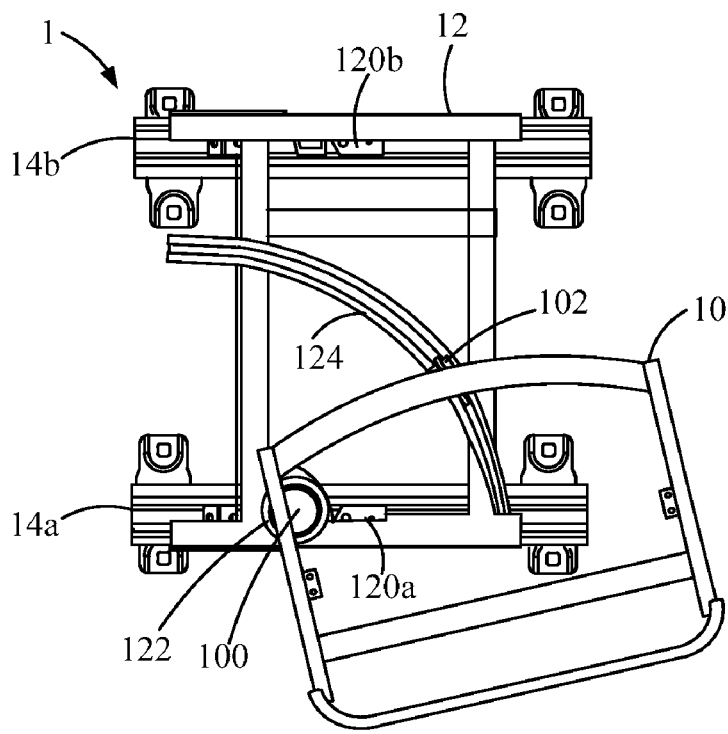

Please refer to FIG. 3A and FIG. 3B. FIG. 3A and FIG. 3B are top views illustrating the adjusting apparatus according to the invention. As shown in the figures, when the axle 100 rotates in the receiving base 122, the guiding wheel 102 moves along the rotation-guiding groove 124, so that the supporting member 10 rotates opposite to the base 12.

In practice, the adjusting apparatus of the invention also can comprise a suitable structure strengthening apparatuses for strengthening the support of the adjusting apparatus of the seat and increasing its durability. For example, the base can comprise a stiffening plate which is mounted on the bottom of the base for strengthening the base. Besides, several portions of the adjusting apparatus of the invention can be formed in an integrated way to simplify its manufacturing process and provide higher durability.

Figure 4:
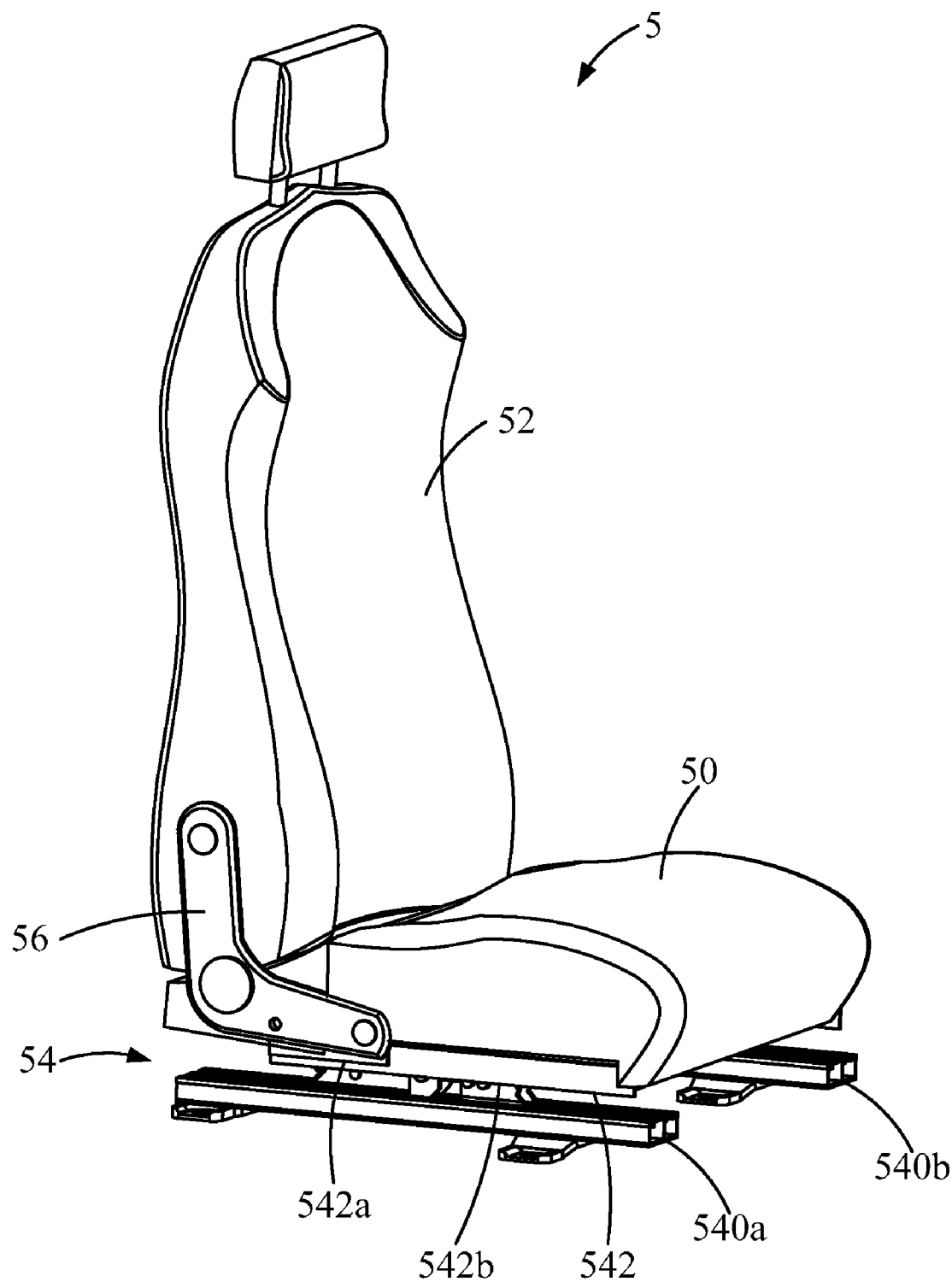
FIG. 4 is a pictorial view illustrating the vehicle seat according to an embodiment of the invention.

The invention also provides a vehicle seat comprising aforementioned adjusting apparatus. Please refer to FIG. 4. FIG. 4 is a pictorial view illustrating the vehicle seat according to an embodiment of the invention. As shown in the figure, the vehicle seat 5 of the invention comprises a cushion 50, a seat back 52 and an adjusting apparatus 54. As mentioned above, the adjusting apparatus 54 as well comprises a first guiding rail 540a, a second guiding rail 540b, a base 542 and a supporting member (not shown in the figure).

Particularly, as shown in the figure, the seat back 52 is combined and mounted on the mounting portion 542a of the base 542 of the adjusting apparatus 54 via a tilting member 56, and the tilting angle of the seat back 52 can be adjusted via the tilting member 56. Besides, the cushion 50 is mounted on the supporting member When sliding portions 542b of the base 542 slides in the guiding rails 540a and 540b, the base 542 and the supporting member drive the cushion 50 and the seat back 52 to slide opposite to the guiding rails 540a and 540b. Additionally, when the axle of the supporting member rotates in the receiving base of the base 542, the guiding wheel of the supporting member moves along the rotation-guiding groove of the base 542, so that the supporting member drives the cushion 50 to rotate opposite to the base 542.

Compared to the prior art, the adjusting apparatus of the invention is using the axle and the guiding wheel of the supporting member, collocated with the receiving base and the rotation-guiding groove of the base, to rotate the cushion of the vehicle seat. Thus, even under the restriction of smaller vehicle space, the adjusting apparatus also can smoothly move the cushion of the vehicle seat out of the vehicle door, so as to combine with a matched wheelchair for facilitating a handicapped person to access the vehicle without other people's help. Particularly, only the cushion is moved out of the vehicle door (while the seat back is still in the vehicle) when the vehicle seat of the invention rotates, so that the vehicle seat of the invention can be disposed at the position of the driver without the interruption of the steering wheel.

In addition, the invention can achieve the function of moving forward and backward for a general vehicle seat without additional apparatuses or elements. Besides, because of simple structure, low cost and easy assembly, the invention can provide a cheaper price, convenient assembly and use experience of the adjusting apparatus of the vehicle seat for a user. Moreover, the size of the adjusting apparatus of the invention can be reduced or enlarged depending on situations, so as to be suitable for different types of vehicles and have wonderful elasticity in its design.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An adjusting apparatus for adjusting a seat of a vehicle, the adjusting apparatus comprising:
    a first guiding rail mounted on a floor of the vehicle;
    a base comprising:
    a first sliding portion slidably disposed in the first guiding rail;
    a receiving base disposed on the first sliding portion; and
    a rotation-guiding groove; and
    a supporting member comprising:
    an axle, disposed on a first side of the supporting member, rotatably mounted in the receiving base; and
    a guiding wheel, disposed on a second side of the supporting member, movably disposed in the rotation-guiding groove;
    wherein the base and the supporting member slide opposite to the first guiding rail when the first sliding portion slides in the first guiding rail;
    wherein the guiding wheel rolls along the rotation-guiding groove when the axle rotates in the receiving base, so that the supporting member rotates opposite to the base.

2. The adjusting apparatus of claim 1, further comprising:
    a second guiding rail, mounted on the floor of the vehicle corresponding to the first guiding rail, and the second guiding rail being parallel to the first guiding rail.

3. The adjusting apparatus of claim 2, wherein the base further comprises:
    a second sliding portion slidably disposed in the second guiding rail.

4. The adjusting apparatus of claim 1, wherein the base further comprises:
    a stiffening plate, mounted on the bottom of the base, for strengthening the base.

5. The adjusting apparatus of claim 1, wherein the base further comprises:
    a first mounting portion, disposed on one side of the base, for combining and mounting a seat back of the seat.

6. The adjusting apparatus of claim 5, wherein the first mounting portion combines and mounts the seat back via a tilting member, and the tilting angle of the seat back is capable of being adjusted via the tilting member.

7. The adjusting apparatus of claim 5, wherein the base further comprises:
    a second mounting portion, disposed on the other side of the base opposite to the first mounting portion, for combining and mounting the seat back.

8. The adjusting apparatus of claim 1, wherein the supporting member is mounted on a bottom surface of a cushion of the seat.

9. The adjusting apparatus of claim 1, wherein the rotation-guiding groove is located on the circumference of a virtual circle, and the center of the virtual circle is the receiving base.

10. The adjusting apparatus of claim 1, wherein the first side of the supporting member is perpendicular to the second side of the supporting member.

11. A vehicle seat comprising:
    a cushion;
    a seat back;
    a first guiding rail mounted on a floor of a vehicle;
    a base comprising:
    a first sliding portion slidably disposed in the first guiding rail;
    a receiving base disposed on the first sliding portion;
    a rotation-guiding groove; and
    a first mounting portion, disposed on one side of the base, for combining and mounting the seat back; and
    a supporting member mounted on the bottom of the cushion, the supporting member comprising:
    an axle, disposed on a first side of the supporting member, rotatably mounted in the receiving base; and
    a guiding wheel, disposed on a second side of the supporting member, movably disposed in the rotation-guiding groove;
    wherein the base and the supporting member drive the cushion and the seat back to slide opposite to the first guiding rail when the first sliding portion slides in the first guiding rail;
    wherein the guiding wheel rolls along the rotation-guiding groove when the axle rotates in the receiving base, so that the supporting member drives the cushion to rotate opposite to the base.

12. The vehicle seat of claim 11, further comprising:
    a second guiding rail, mounted on the floor of the vehicle corresponding to the first guiding rail, and the second guiding rail being parallel to the first guiding rail.

13. The vehicle seat of claim 12, wherein the base further comprises:
    a second sliding portion slidably disposed in the second guiding rail.

14. The vehicle seat of claim 11, wherein the base further comprises:
    a stiffening plate, mounted on the floor of the vehicle, for strengthening the base.

15. The vehicle seat of claim 11, wherein the first mounting portion combines and mounts to the seat back via a first tilting member, and the tilting angle of the seat back is capable of being adjusted via the first tilting member.

16. The vehicle seat of claim 15, wherein the base further comprises:
    a second mounting portion, disposed on the other side of the base opposite to the first mounting portion, for combining and mounting the seat back.

17. The vehicle seat of claim 11, wherein the rotation-guiding groove is located on the circumference of a virtual circle, and the center of the virtual circle is the receiving base.

18. The vehicle seat of claim 11, wherein the first side of the supporting member is perpendicular to the second side of the supporting member.

* * * * *